United States Patent
Mandroiu

(10) Patent No.: US 10,470,452 B2
(45) Date of Patent: Nov. 12, 2019

(54) ROD HELP

(71) Applicant: Florin Robert Mandroiu, Evanston, IL (US)

(72) Inventor: Florin Robert Mandroiu, Evanston, IL (US)

( * ) Notice: Subject to any disclaimer, the term of this patent is extended or adjusted under 35 U.S.C. 154(b) by 180 days.

(21) Appl. No.: 15/732,974

(22) Filed: Jan. 22, 2018

(65) Prior Publication Data
US 2018/0338483 A1  Nov. 29, 2018

Related U.S. Application Data

(60) Provisional application No. 62/602,686, filed on May 3, 2017.

(51) Int. Cl.
*A01K 97/10* (2006.01)

(52) U.S. Cl.
CPC .................. *A01K 97/10* (2013.01)

(58) Field of Classification Search
CPC ...................................................... A01K 97/10
USPC ....... 248/519, 523, 524, 527, 535, 539, 541; 43/21.2; 47/40.5; D11/130, 130.1
See application file for complete search history.

(56) References Cited

U.S. PATENT DOCUMENTS

| | | | | |
|---|---|---|---|---|
| 2,249,302 A * | 7/1941 | Smith | A01K 97/10 43/21.2 |
| 3,469,342 A * | 9/1969 | Morris | A47G 33/12 47/79 |
| 3,902,269 A * | 9/1975 | Dunlap | A01K 97/10 43/21.2 |
| 3,977,118 A * | 8/1976 | Seymour | A01K 91/08 43/21.2 |
| 4,436,272 A * | 3/1984 | Lile | A47G 33/12 248/527 |
| 4,485,579 A * | 12/1984 | Hawie | A01K 97/10 248/512 |
| 4,551,939 A * | 11/1985 | Kitchens | A01K 97/10 248/513 |
| 5,157,868 A * | 10/1992 | Munoz | A01G 27/005 47/40.5 |
| D330,875 S * | 11/1992 | Boucher | D11/130.1 |
| 5,465,529 A * | 11/1995 | Park | A47G 33/12 248/524 |
| 5,568,909 A * | 10/1996 | Timko | E04H 12/2261 248/519 |
| D396,824 S * | 8/1998 | Bolster | D11/130.1 |
| D403,980 S * | 1/1999 | Conway | D11/130.1 |
| D418,082 S * | 12/1999 | Baumann | D11/130.1 |
| 6,712,330 B1 * | 3/2004 | Damiano | E04H 12/2261 248/519 |
| 7,694,487 B1 * | 4/2010 | Ryan | E04H 12/2269 248/156 |
| D662,745 S * | 7/2012 | Zalewski | D6/552 |
| D696,835 S * | 12/2013 | Rogerson | D99/43 |

(Continued)

*Primary Examiner* — Joshua E Rodden

(57) ABSTRACT

A new type of device that can be used in fishing. This device keeps a fishing rod upright and in place ensuring that the entire fishing rod and reel isn't taken by a fish. The device consists of a circular metallic weight, which is placed flat on the ground or an even surface. An upright and hollow aluminum tubing is welded on top of the weight. The aluminum tubing has 4 eye bolts inserted into it, which are designed to keep the fishing pole upright and in place without movement.

1 Claim, 11 Drawing Sheets

(56) References Cited

U.S. PATENT DOCUMENTS

2002/0113190 A1\* 8/2002 Berthiaume ........ E04H 12/2269
 248/523
2011/0056112 A1\* 3/2011 Christianson .......... A01K 97/01
 43/17

\* cited by examiner

ROD HELP

BACKGROUND OF THE INVENTION

The ROD HELP invention is made up of 3 very old implements and it's designed to be used in fishing.

The first implement, as shown in FIG. 8, is the "eye bolt" and there does not seem to be any active patents on the "eye bolt".

The second implement, as shown in FIG. 9, is the "hollow aluminum tubing" and this has been used primarily in plumbing for over 100 years. There seems to be no active patent on the "hollow aluminum tubing".

The third implement, as shown in FIG. 10, is a round weight.

Round weights have been around since ancient times and there is no active patent on a round weight.

The only implement that seems to be somewhat similar to the ROD HELP invention is a Christmas tree stand, as shown in FIG. 11.

However there is one major difference between the ROD HELP invention and the Christmas tree stand which is that the ROD HELP uses a heavy round weight to steady itself on the ground while a Christmas tree stand uses 4 metallic legs to steady itself on the ground. Also the ROD HELP is designed to withstand hefty tugs from strong fish while a Christmas tree stand is only designed to keep a Christmas tree upright.

BRIEF SUMMARY OF THE INVENTION

The ROD HELP is a utility patent design and the purpose of it is to keep a fishing rod upright and in place ensuring that the entire fishing rod and reel isn't taken by a fish.

The way it would achieve this is by placing the fishing rod in a hollow aluminum tubing which is welded on top of a circular cast iron weight.

The fishing rod is held in place inside the hollow aluminum tubing by 4 eye bolts.

There are 4 equidistant holes in the hollow aluminum tubing in which the 4 eye bolts are screwed in.

DETAILED DESCRIPTION OF THE INVENTION

Figure 1:
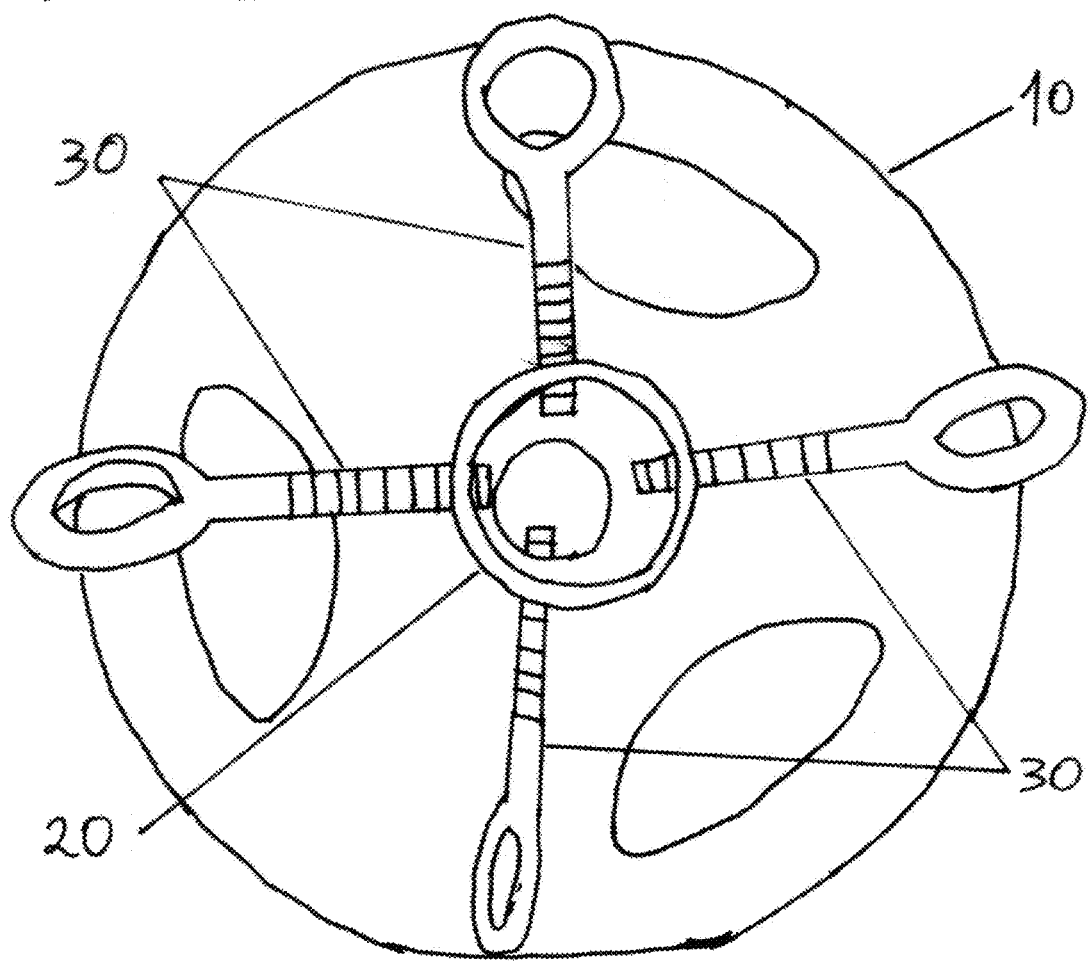
FIG. 1 shows the ROD HELP invention from above.
Figure 2:
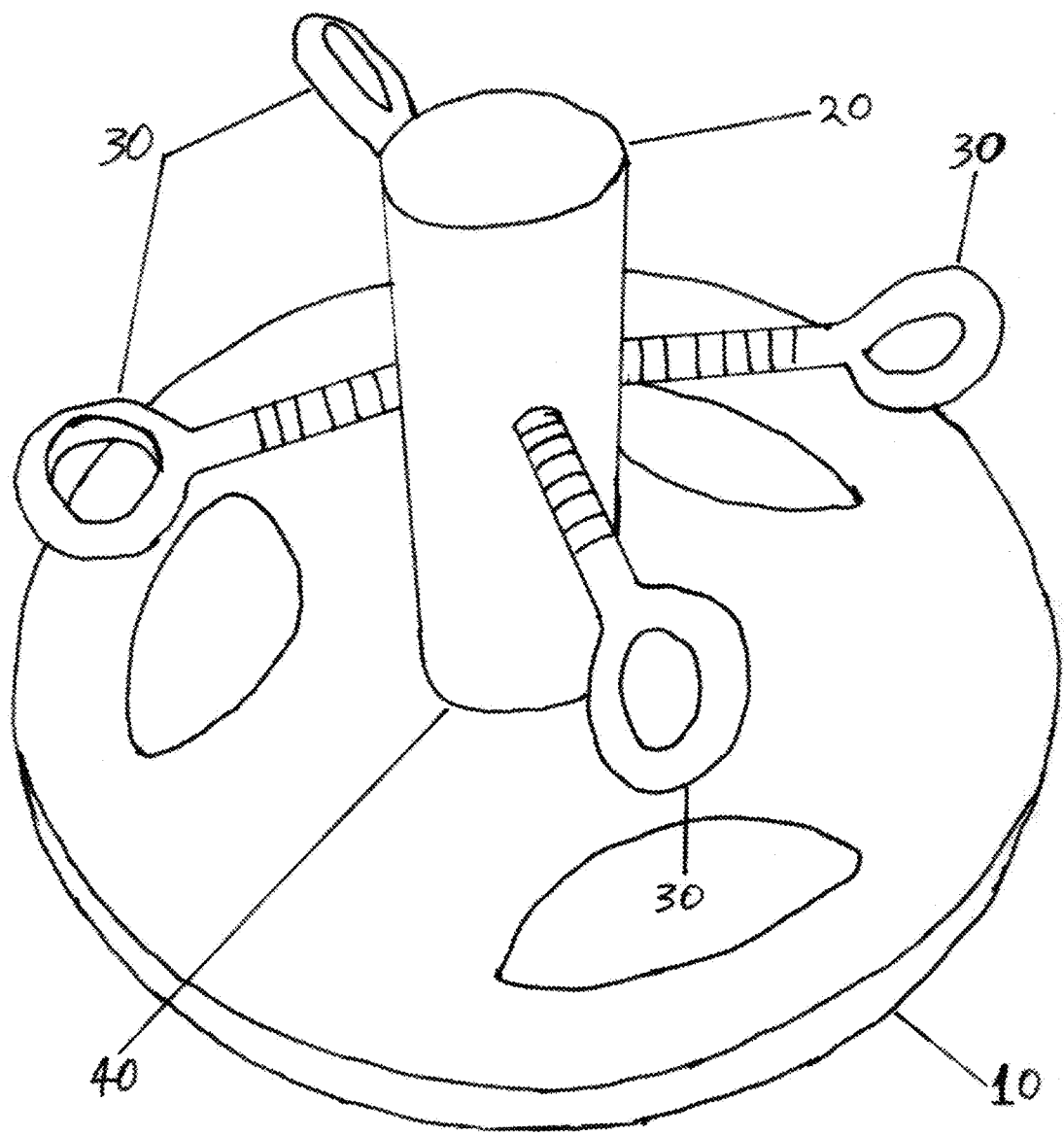
FIG. 2 shows the ROD HELP invention from the above and to the side.
Figure 3:
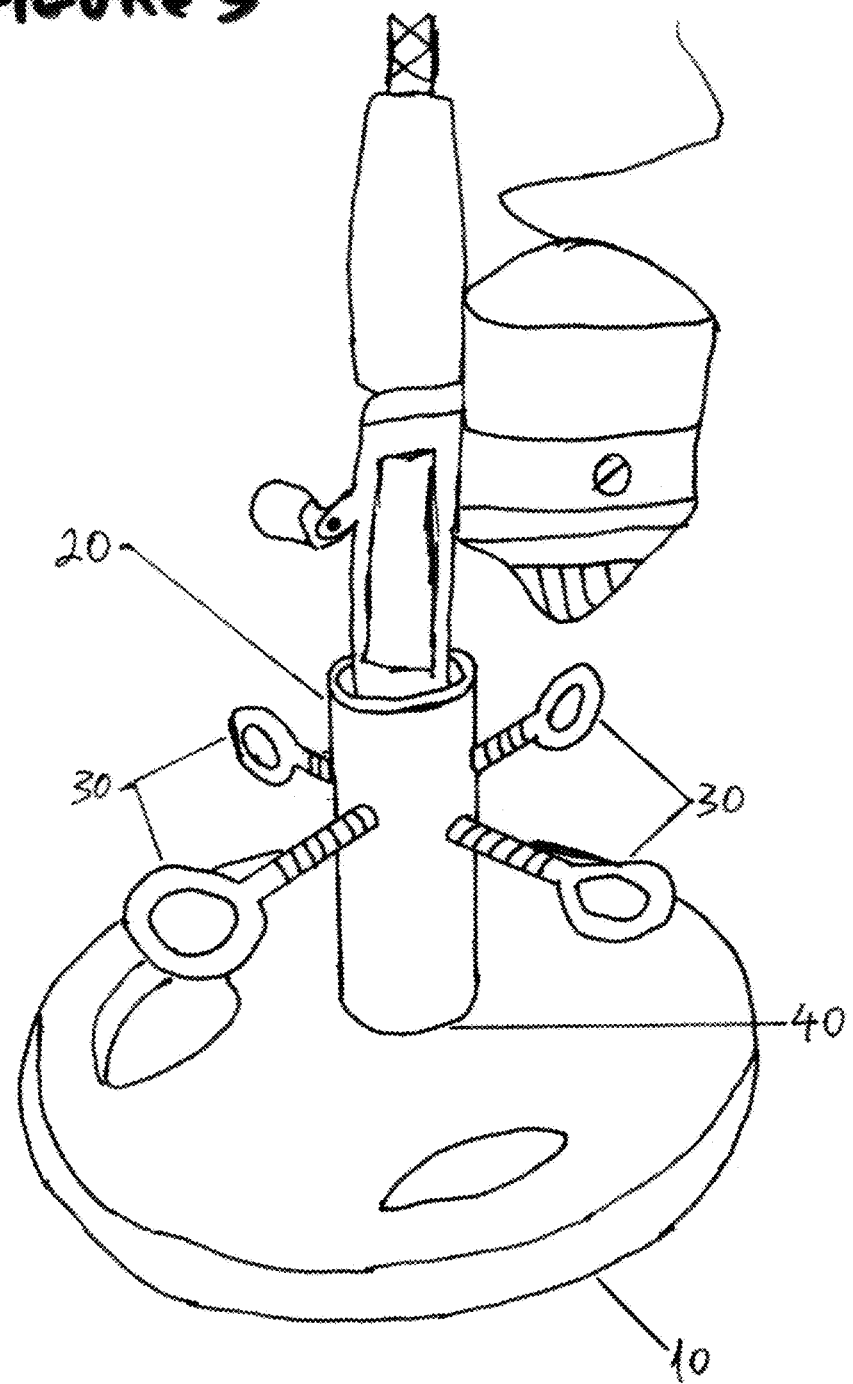
FIG. 3 shows the ROD HELP invention from the side with a fishing rod inserted into it.
Figure 4:
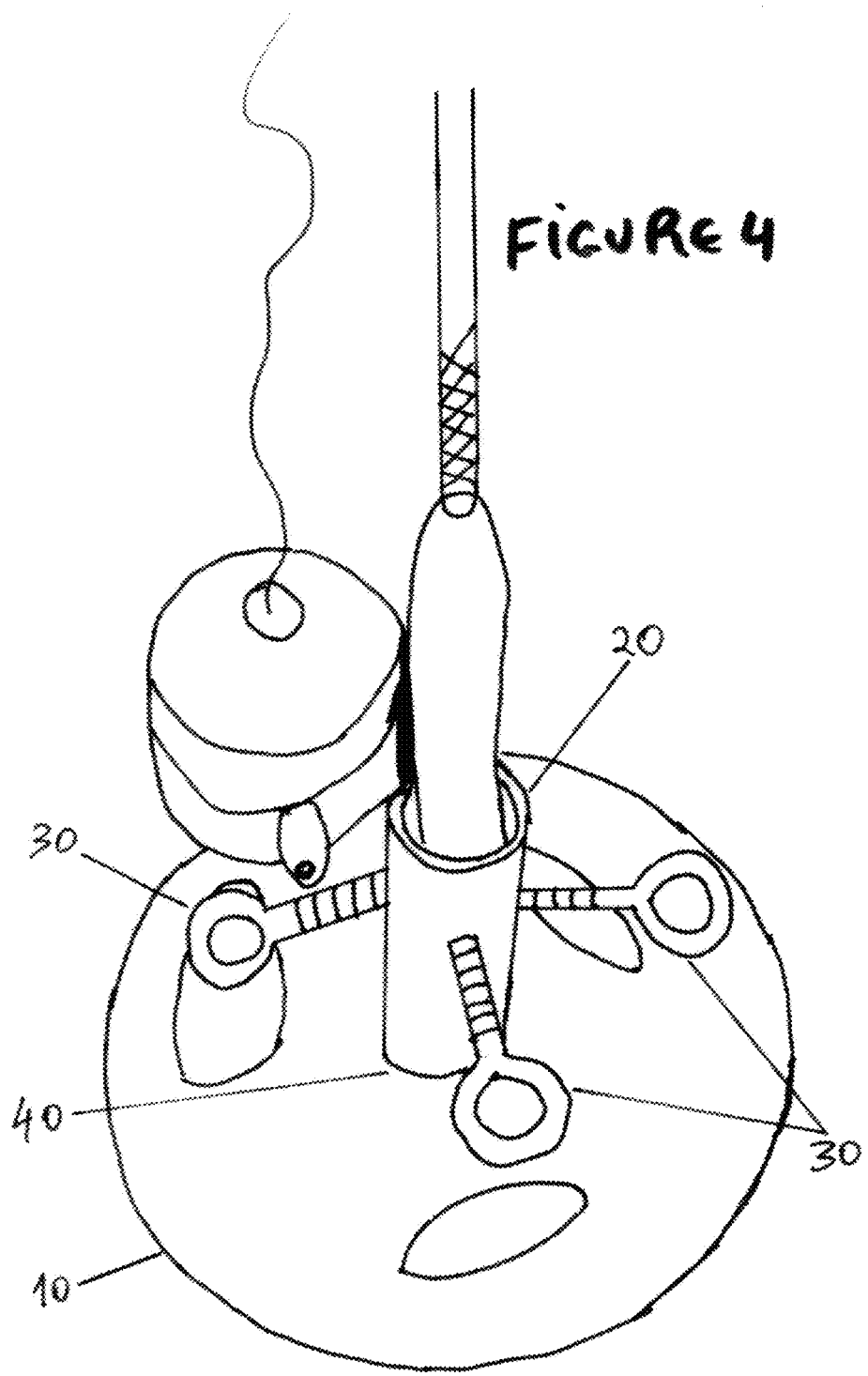
FIG. 4 shows the ROD HELP invention from above and to the side with a fishing rod inserted into it.
Figure 5:
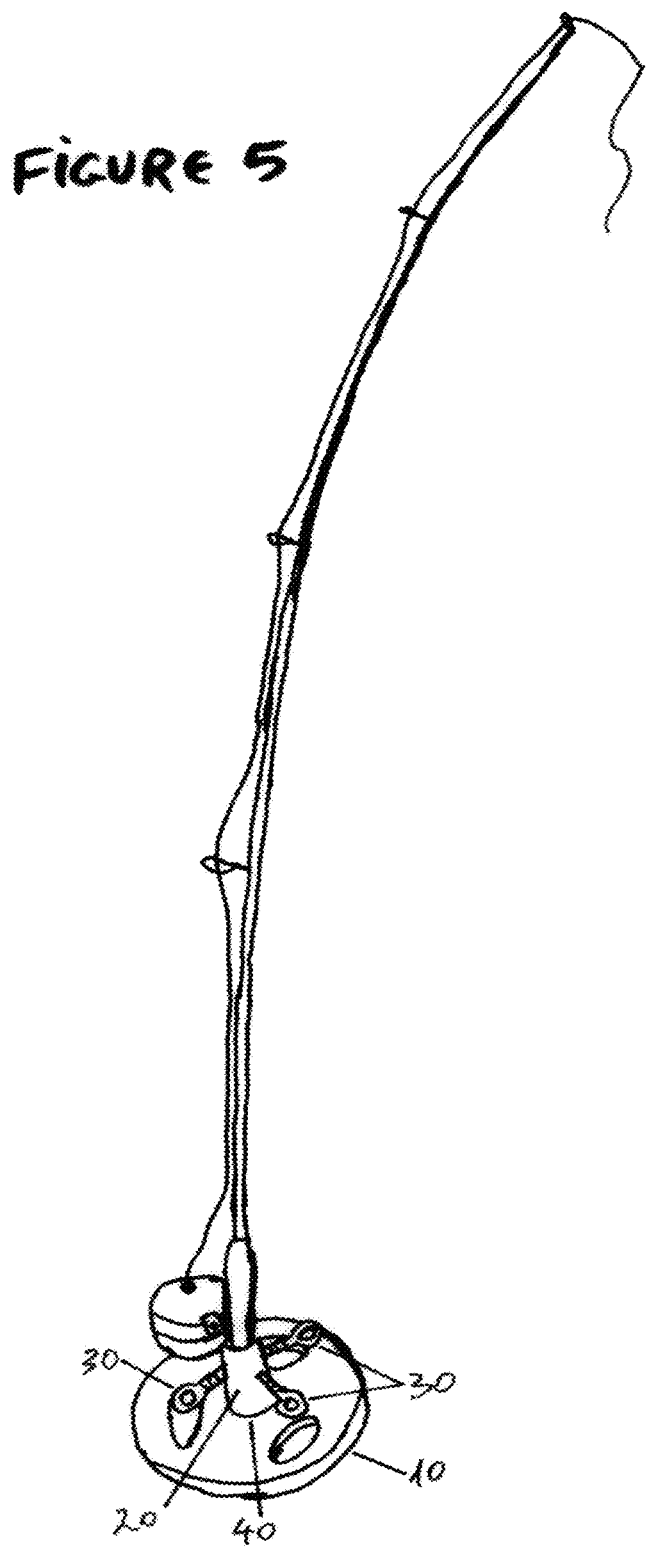
FIG. 5 shows the ROD HELP invention from a small distance from above and to the side, with a fishing rod inserted into it.
Figure 6:
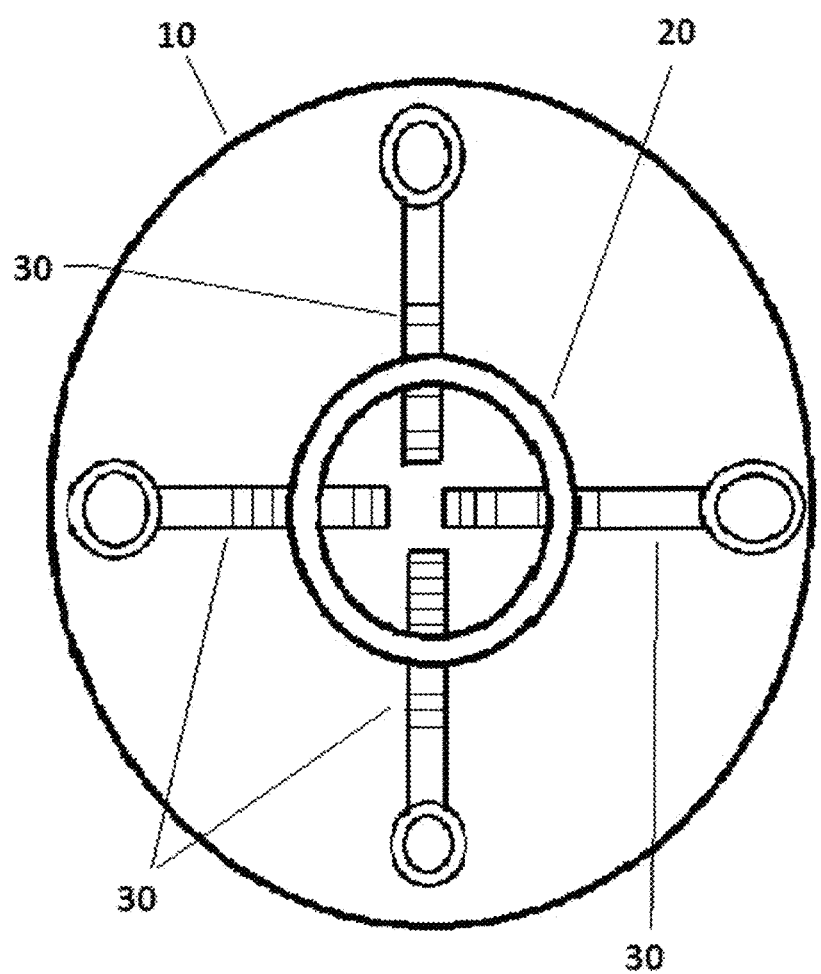
FIG. 6 shows the ROD HELP invention from above as a computer drawing.
Figure 7:
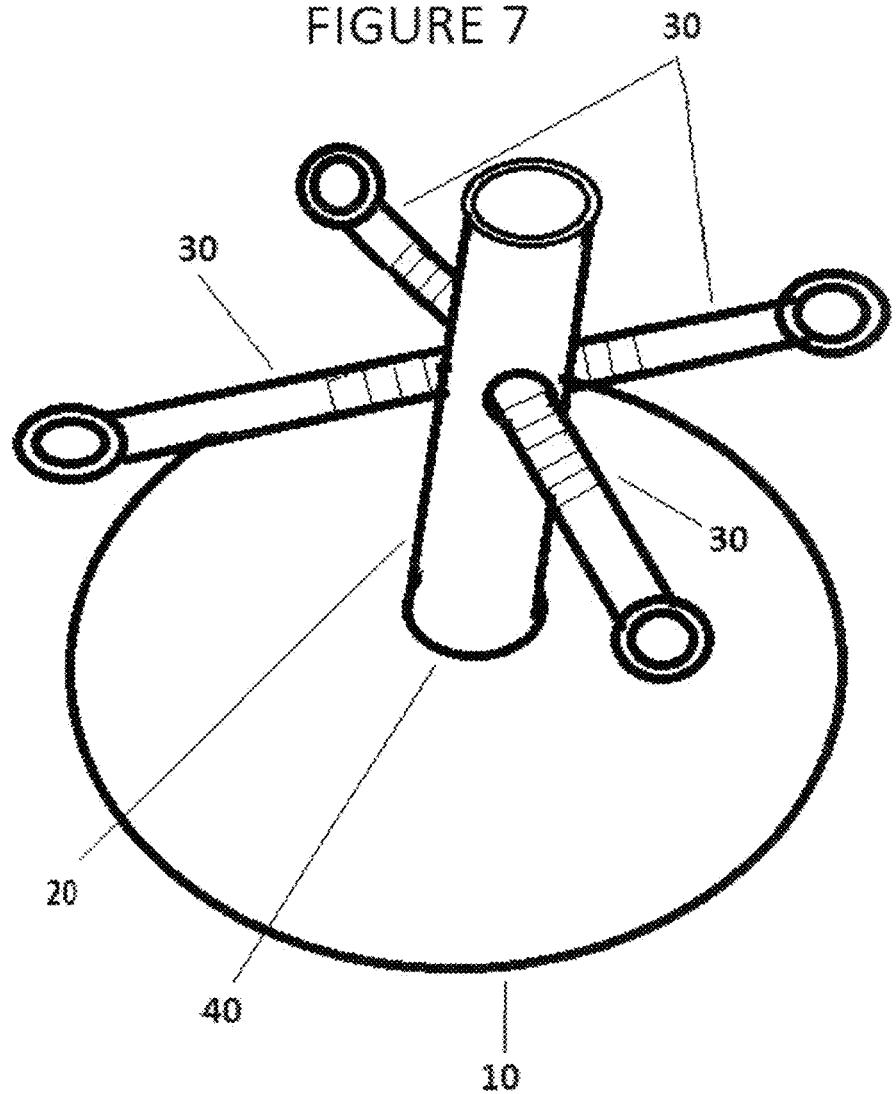
FIG. 7 shows the ROD HELP invention from the side as a computer drawing.
Figure 8:
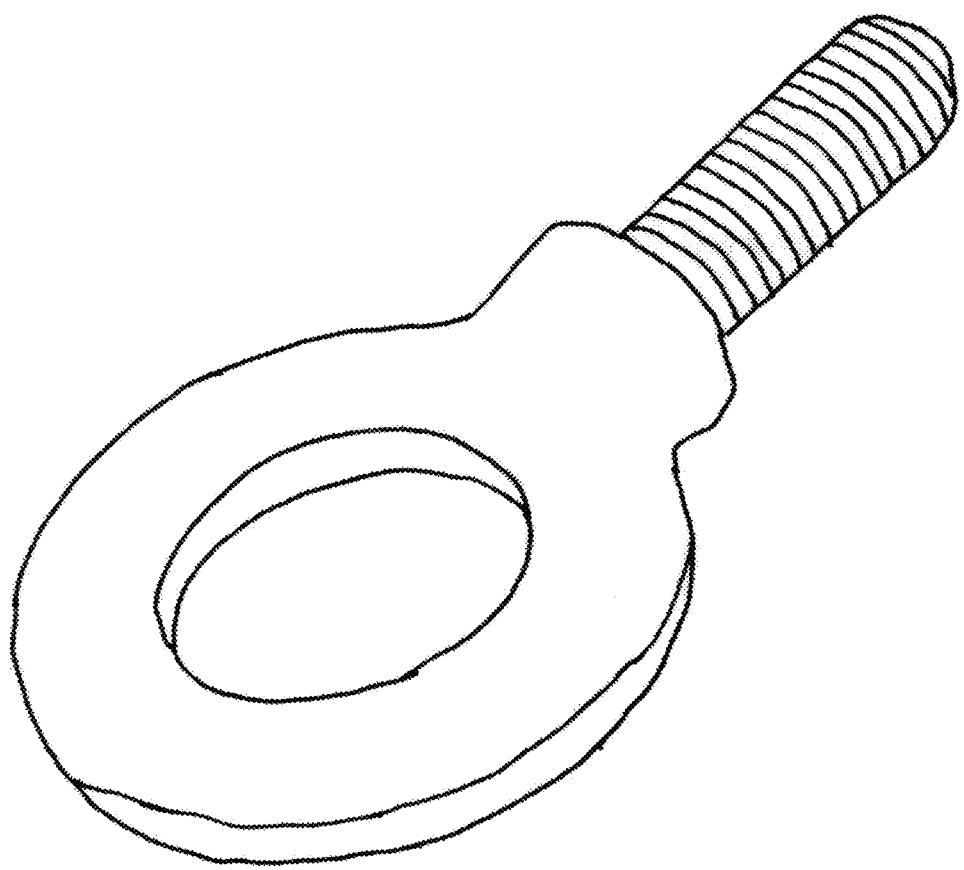
FIG. 8 shows the PRIOR ART picture of an EYE BOLT.
Figure 9:
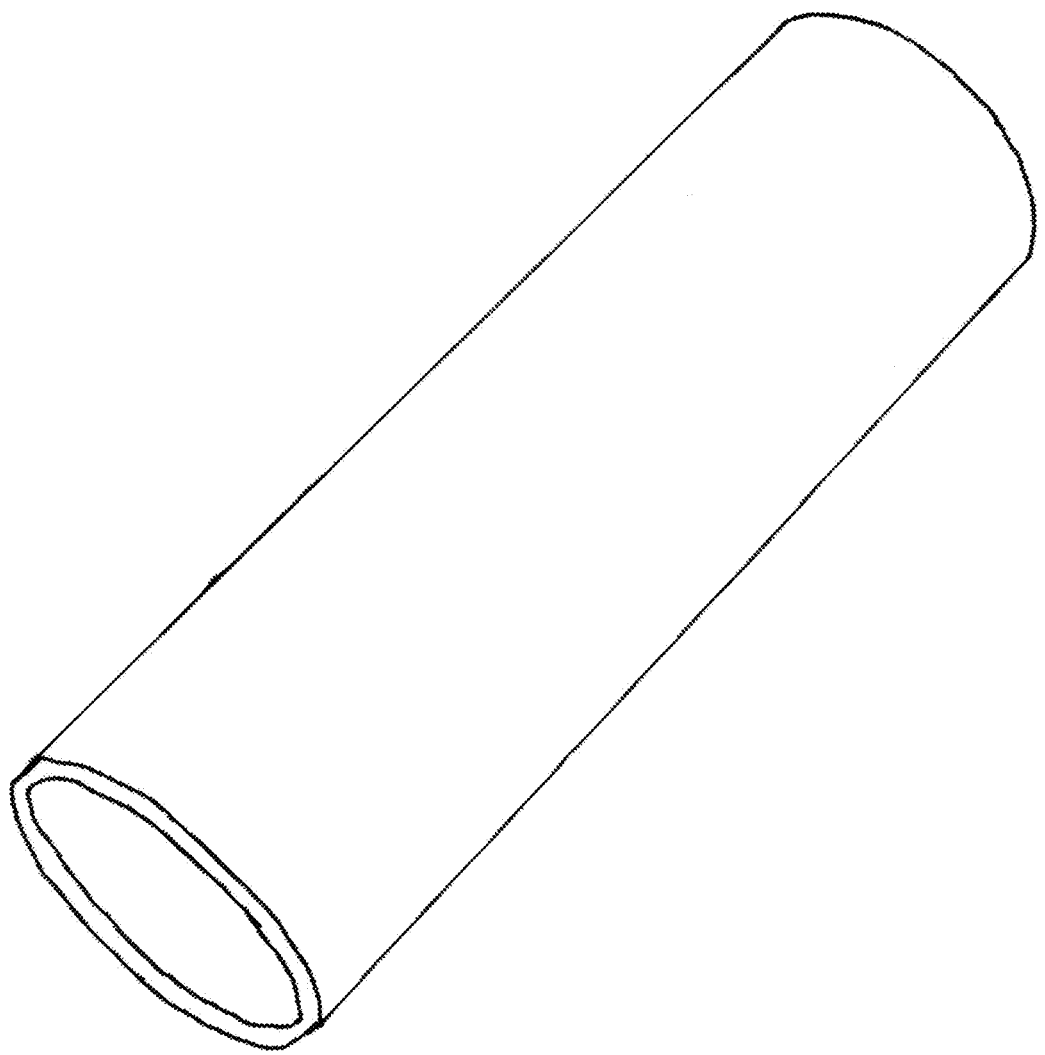
FIG. 9 shows the PRIOR ART picture of an HOLLOW ALUMINUM TUBE.
Figure 10:
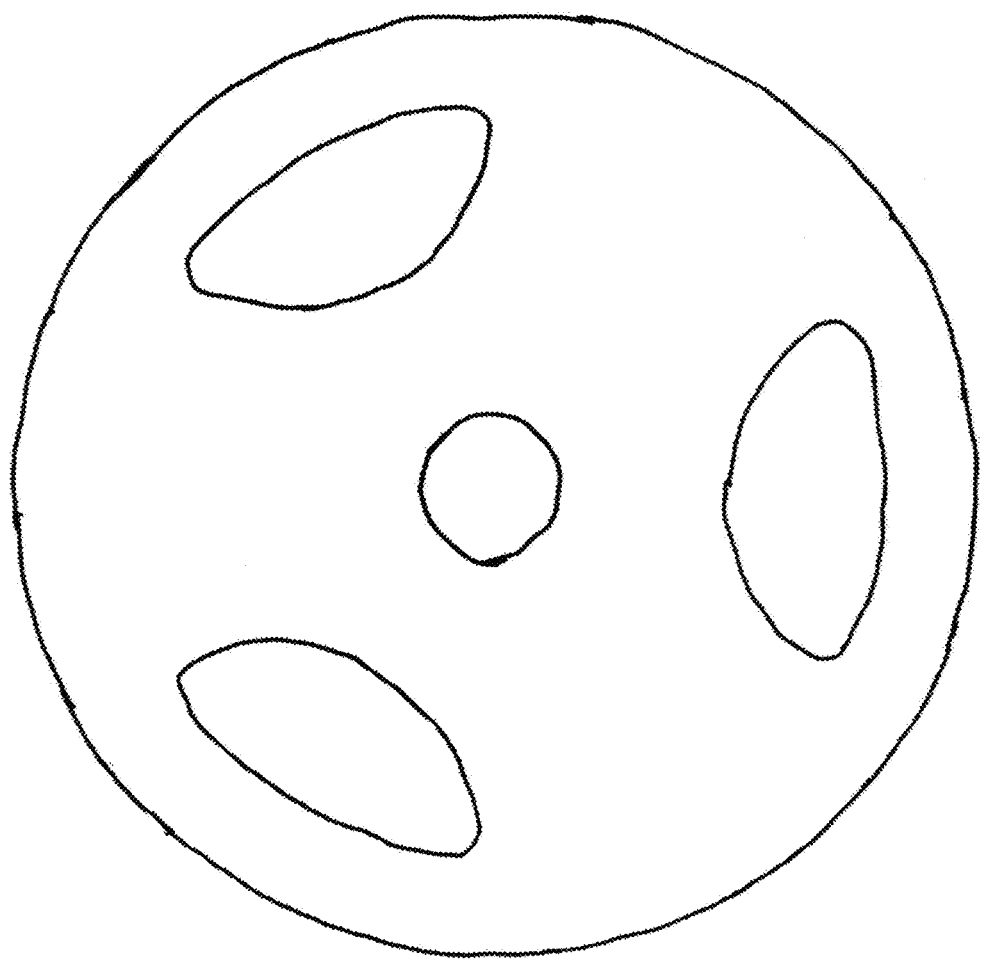
FIG. 10 shows the PRIOR ART picture of an ROUND CAST IRON WEIGHT.
Figure 11:
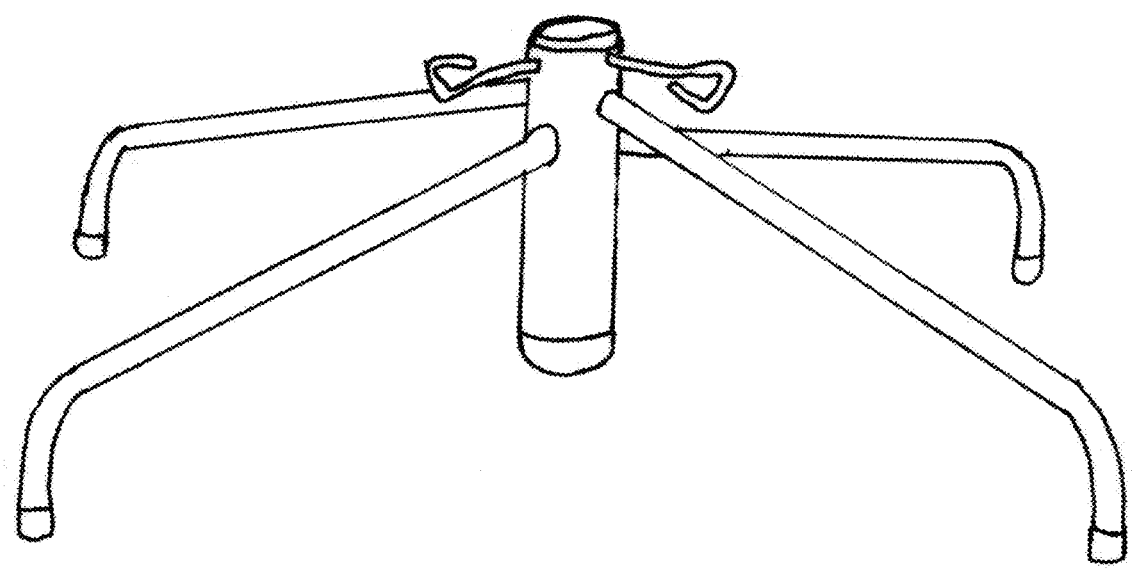
FIG. 11 shows the PRIOR ART picture of an CHRISTMAS TREE STAND.

The ROD HELP invention is a new fishing tool designed to help a fisherman not lose a fish or his/her fishing rod. The ROD HELP consists of 3 very old implements, that when combined together, create the brand new utility patent design named ROD HELP. The implements are:

10 A round cast iron weight.
20 A hollow aluminum tube.
30 4 eye bolts which are exact copies of each other.
40 Weld.
50 Openings.

The way the ROD HELP invention is made is by placing the round cast iron weight 10 flat to the ground, welding 40 the hollow aluminum tubing 20 in the middle of the round weight 10 and then screwing 4 equidistant holes in the hollow aluminum tubing 20 where the 4 eye bolts 30 can be screwed in. The aluminum tube 20 would be welded 40 to the cast iron weight 10 to such a degree that it would have a permanent bond with the cast iron weight 10 in order to ensure no movement in the aluminum tube 20.

What the ROD HELP invention is designed to do is to keep a fishing rod upright and in place, when placing it inside the hollow aluminum tubing 20, by having the 4 eye bolts 30 tightened on the fishing rod. This prevents large fish from taking a fisherman's rod. The fisherman is also able to notice a fish bite easier and the fisherman no longer would need to prop his fishing rod on various random objects on the beach.

The round cast iron weight 10 may very anywhere from 10 pounds in weight to 100 pounds in weight based on the size of the fish the fisherman is trying to catch.

The new ROD HELP invention is primarily designed to be used for shoreline fishing but it can also be used in fishing from boats.

The invention claimed is:

1. A fishing implement consisting of: one round cast iron weight in the form of a circular plate; one elongated hollow aluminum tube, wherein said elongated hollow aluminum tube is welded at one end to said round cast iron weight at a center of said round cast iron weight, such that another end of said aluminum tube is open upwardly and configured to receive a fishing pole; four eye round bolts, wherein said four eye round bolts are screwed into the hollow aluminum tube in a equidistant manner; and three openings in said round cast iron weight which are spaced around said aluminum tube.

* * * * *